(12) United States Patent
Scordilis et al.

(10) Patent No.: US 11,695,196 B2
(45) Date of Patent: *Jul. 4, 2023

(54) ANTENNA DEVICE FOR TIMEPIECE

(71) Applicant: The Swatch Group Research and Development Ltd, Marin (CH)

(72) Inventors: Thierry Scordilis, Cormondreche (CH); Zoran Randjelovic, Corcelles (CH); Jean Gorisse, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 73 days.

This patent is subject to a terminal disclaimer.

(21) Appl. No.: 17/315,424

(22) Filed: May 10, 2021

(65) Prior Publication Data

US 2022/0077568 A1 Mar. 10, 2022

(30) Foreign Application Priority Data

Sep. 4, 2020 (EP) ..................................... 20194645

(51) Int. Cl.
*H01Q 1/22* (2006.01)
*G04G 21/04* (2013.01)
(Continued)

(52) U.S. Cl.
CPC ........... *H01Q 1/2291* (2013.01); *G04G 21/04* (2013.01); *H01Q 1/38* (2013.01); *H01Q 1/526* (2013.01); *H04B 1/38* (2013.01)

(58) Field of Classification Search
CPC ........ H01Q 1/2291; H01Q 1/38; H01Q 1/526; G04G 21/04; H04B 1/38
See application file for complete search history.

(56) References Cited

U.S. PATENT DOCUMENTS

| 8,648,756 B1* | 2/2014 | Desclos | ............... H01Q 5/35 |
| | | | 343/702 |
| 9,786,994 B1* | 10/2017 | Lee | ............... H01Q 21/0006 |

(Continued)

FOREIGN PATENT DOCUMENTS

| EP | 1 315 052 A1 | 5/2003 |
| WO | WO 2020/129352 A1 | 6/2020 |

OTHER PUBLICATIONS

European Search Report dated Feb. 10, 2021 in European Application 20194645.6 filed Sep. 4, 2020 (with English Translation of Categories of Cited Documents), 3 pages.

*Primary Examiner* — Junpeng Chen
(74) *Attorney, Agent, or Firm* — Oblon, McClelland, Maier & Neustadt, L.L.P.

(57) ABSTRACT

An antenna device intended to be used in a communication system of a timepiece, including a substrate; a first antenna circuit made on the substrate and having first and second strands which are connected and having a proximal end and a distal end, extending in parallel, a second antenna circuit made on the substrate and having third and fourth strands which are connected and having a proximal end and a distal end, and extending in parallel, an electrical junction link joining the proximal ends of the first and third strands; a connection portion configured to be bent relative to the electrical junction link, and including a conductive connection which is connected to the electrical junction link and including an electromagnetic shielding of the conductive connection.

14 Claims, 2 Drawing Sheets

(51) Int. Cl.
  *H01Q 1/38* (2006.01)
  *H01Q 1/52* (2006.01)
  *H04B 1/38* (2015.01)

(56) References Cited

U.S. PATENT DOCUMENTS

| | | | |
|---|---|---|---|
| 2008/0001833 A1* | 1/2008 | Kaneoya | H01Q 5/378 |
| | | | 343/702 |
| 2011/0156963 A1* | 6/2011 | Rajgopal | H01Q 15/0086 |
| | | | 343/702 |
| 2018/0062275 A1* | 3/2018 | Kim | H01Q 1/2208 |
| 2020/0243943 A1 | 7/2020 | Takahashi | |
| 2021/0313670 A1* | 10/2021 | Taga | G04R 60/10 |

* cited by examiner

ANTENNA DEVICE FOR TIMEPIECE

CROSS-REFERENCE TO RELATED APPLICATION

This application claims priority to European Patent Application No. 20194645.6 filed on Sep. 4, 2020, the entire disclosure of which is hereby incorporated herein by reference.

TECHNICAL FIELD OF THE INVENTION

The invention concerns an antenna device used in a communication system for a timepiece.

Technological Background of the Invention

For several years now, watches have been integrating means of communication in order to be able to be connected to different networks of communication, such as Bluetooth to be linked to a mobile terminal, and of geolocation, to be connected to different satellite positioning systems such as GPS, Glonass or Galileo. For this, a watch integrates one or several antenna(s).

It is known that the optimum size of an antenna depends directly on the wavelength of the transmitted/received signal. An antenna of optimal length allows sending/receiving a signal as a whole and at full power.

In a watch, the available space being limited, an antenna must have a design which is adapted to fit into the middle of the watch.

And if the watch incorporates a means of radio communication which operates on radio frequencies (such as 2.4 GHz or 1.5 GHz), the size of the product becomes critical relative to the wavelength (120 mm and 200 mm).

Moreover, other constraints must also be taken into account:

The watch includes many metal portions, in particular the middle thereof, and an antenna must be insulated therefrom.

The watch can integrate several communication devices in the same case, as specified above. The watch cannot have a volume exceeding a certain size (maximum diameter of 50 mm as a general rule).

The aim of the invention is to have an antenna device intended to be used in a communication system of a timepiece, such as a watch, which integrates at least two antenna circuits each having an optimal length to send/receive a signal as a whole and at full power and fit into the middle of a watch, whose accommodation volume is limited.

SUMMARY OF THE INVENTION

This aim is achieved by producing a single radiating structure of miniature multiband type which uses the properties of nearby materials (metal middle, sapphire crystal). This integration is made possible by a separation between the physical integration (the construction) and the antenna form, thanks to a printing technique (pcb flex for example). This multiband structure being connected to the electronics through circuitry of the rejection filter type.

BRIEF DESCRIPTION OF THE FIGURES

Other features and advantages of the present invention will emerge more clearly from the following detailed description, made in conjunction with the appended figures listed below.

DETAILED DESCRIPTION OF AN EMBODIMENT OF THE INVENTION

In the remainder of the description, the terms "top", "bottom", "upper", "lower", "above" "below" are to be considered taking into account a horizontal median plane (P) parallel to the horizontal bearing plane of the case of the timepiece on a surface.

The terms "outer", "external", "inner" and "internal" are to be understood by taking into account a median axis (X) oriented perpendicularly to said median plane.

The present invention concerns an antenna device intended to be used in a communication system to be integrated into the case of a timepiece, in particular a wristwatch or even a connected watch or a connected wristwatch.

Figure 2:
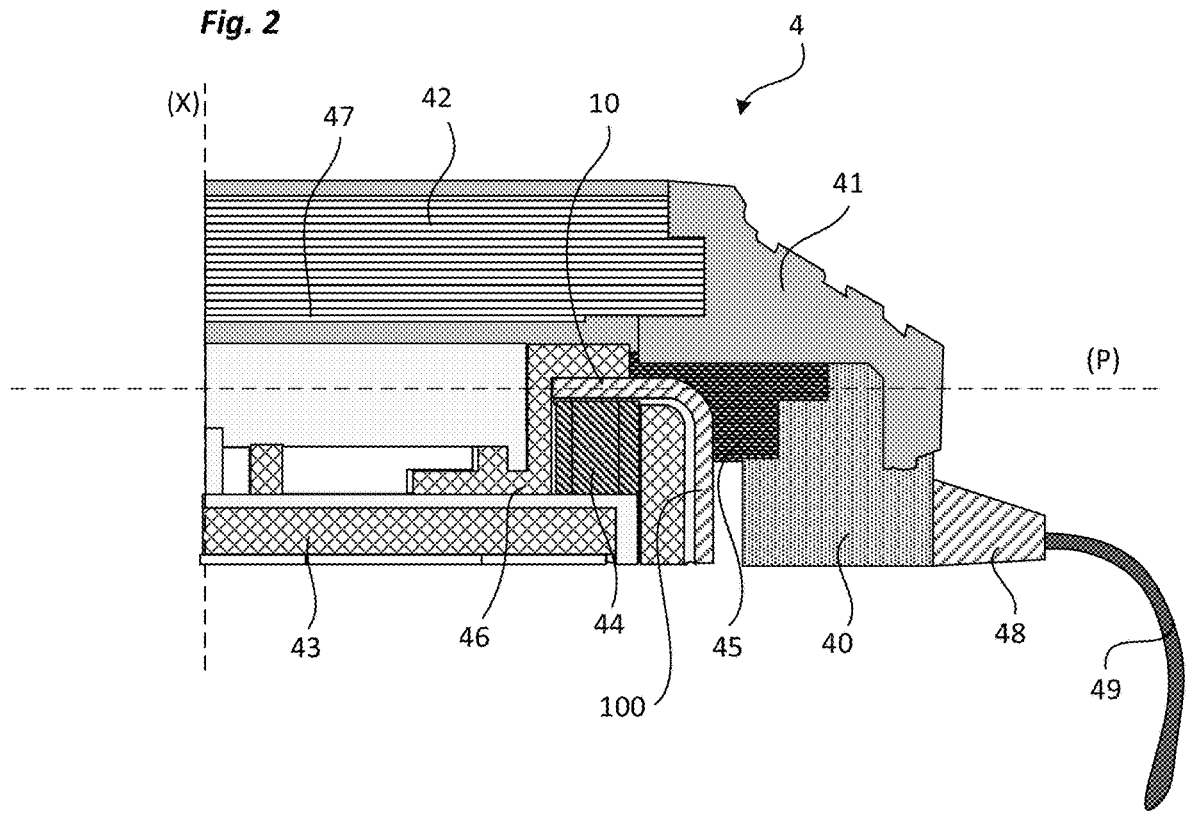
FIG. 2 represents a partial sectional view of a timepiece incorporating the antenna device according to the invention.

With reference to FIG. 2, the case of a timepiece 4 comprises an accommodation volume defined by a middle 40, generally made of metal material, forming the lateral wall thereof around said median axis, made in a single portion or in two portions with an upper bezel 41, for example made of ceramic or titanium. The accommodation volume of the timepiece 4 is closed from above by means of a glass 42, for example made of sapphire crystal, supported by the middle 40 and sealingly fastened thereto by a suitable method. The timepiece also comprises a back wall (not visible), for example metallic, located opposite to the glass 42 thereof relative to the median plane, advantageously insulated from the middle by a seal, closing off the volume of welcome from the bottom.

According to a particular aspect of the invention, the timepiece 4 includes a communication system which mainly includes:

communication antenna device 1 and,

A duplexer/rejection type filter circuit 20, known per se to those skilled in the art.

The antenna device 1 includes a substrate 10, advantageously made in the form of a flexible printed circuit (commonly called "flex").

Figure 1:
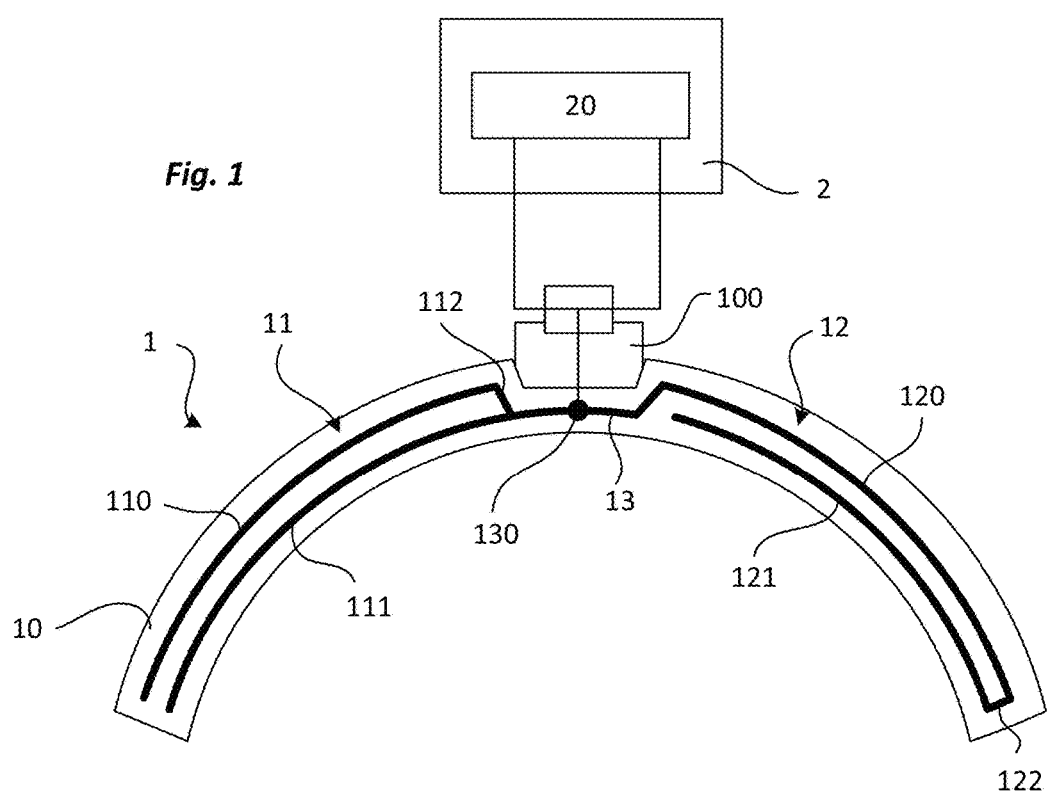
FIG. 1 represents the antenna device according to the invention.

With reference to FIG. 1, the antenna device 1 has the particularity of including two distinct antenna circuits, to allow the timepiece to be connected to two distinct networks, more specifically a Bluetooth type communication network and a GNSS (Geolocation and Navigation Satellite System) satellite positioning network, such as for example the GPS (Global Positioning System), Glonass or Galileo.

The two antenna circuits are made on the same substrate by standard methods used in the field of printed circuits.

According to a particular aspect of the invention:

The first antenna circuit 11 has a first strand 110 and a second strand 111 which each include a proximal end and a distal end, and which extend in parallel between the proximal and distal ends thereof, the first and second strands being connected 112 by the proximal ends thereof and separated at the distal ends thereof;

The second antenna circuit 12 has a third strand 120 and a fourth strand 121 which each include a proximal end and a distal end, and which extend in parallel between the proximal and distal ends thereof, the third and fourth strands being connected 122 by the distal ends thereof and separated at the proximal ends thereof;

An electrical link 13 allows connecting the proximal ends of the first, second and third strands 110, 11, 120. This electrical link 13 includes a single connection point 130 to which said filter circuit 2 is connected. A single connection point 130 will thus allow communicating by selectively using the first and second antenna circuits 11 and 12.

The architecture with two parallel strands of the first antenna circuit 11 allows widening the frequency band (100 MHz), necessary for example to communicate on a communication network of the type Bluetooth (2.4 GHz).

For the second antenna circuit 12 (for example dedicated to a satellite positioning circuit), the antenna is powered on a current node and its length is folded, allowing improving the impedance matching.

The single connection point 130 for the two antenna circuits 11, 12 in parallel allows facilitating the mechanical integration of the antenna device in the accommodation volume of the timepiece 4 as well as design independence between the antenna portion and the electronic portion. Indeed, it is sufficient to adjust the mechanical integration of the support plate of these antenna circuits in the construction, the pattern of the antenna circuits being made subsequently by a standard etching method which does not call into question said mechanical integration. The second antenna circuit 12 with two strands linked in series allows communicating on a narrower frequency band, for example at 1.5 GHz used to communicate on a satellite positioning network (for example GPS).

In this configuration, each antenna circuit 11, 12 extends essentially along a circular arc trajectory by including two strands 110, 111, 120, 121 arranged in parallel on the substrate 10 which follow this path.

By way of example, each antenna circuit 11, 12 can be made over an angular range comprised between 70 and 80° relative to the angle of the angular sector which defines the circular arc formed by this antenna circuit 11, 12 and this, on either side of the electrical junction link. Their trajectory can follow this circular arc made along a radius comprised between 16 and 22 mm. The two strands 110, 111, 120, 121 can be spaced apart from each other by a distance comprised between 1 and 2 mm.

The substrate 10 is in the form of a first plate having a profile made in a circular arc, advantageously in a semicircle. This configuration greatly helps obtaining a circular polarization for the satellite antennas in particular. This configuration also helps for the implementation of the Bluetooth protocol, due to the wave propagation in closed places such as the living spaces. The two antenna circuits are printed on the same face of the plate, the upper face thereof, and each extend on either side of a separation portion carrying the electrical connection 13 joining the two antenna circuits 11 12. This separation portion is advantageously median, separating the substrate into two circular arcs of substantially equal or even equal or strictly equal dimensions.

The antenna device further includes a connection portion 100, being in the form of a protuberance of the plate.

During the integration of the substrate 10 into the middle 40 of the timepiece 4, the connection portion 100 of the substrate 10 is intended to be bent relative to the first plate, about an axis perpendicular to the axis (X) and parallel to the plane (P).

This connection portion 100 includes one or several conductive connection(s) allowing connecting the antenna circuits 11, 12 (at the electrical connection 13) to an electronic control circuit 2 carrying the duplexer/rejection type filter circuit 20. The connection portion 100 includes an electromagnetic shielding of these conductive connections to prevent any radiation to the outside and allow preventing the connection portion 100 from influencing the impedance of the antenna circuits 11 and 12. As such. By way of example, the shielding can be achieved by assembling several superimposed layers: a shielding lower layer, an insulator layer, a layer incorporating the conductive connections, then a new insulator layer and a new shielding upper layer.

A control card carrying the electronic control circuit 2 (the control circuit 2 carrying for example one or more RF transmitting/receiving circuits and of a design known per se) can be arranged in the bottom of the case of the timepiece 4.

The antenna device 1 is connected to the control card, by the connection portion 100 via the conductive connection(s).

With reference to FIG. 2, the timepiece 4 can incorporate a dial 43, advantageously made of metal, which is located above the back wall, in the accommodation volume thereof. This dial may bear aesthetic indications visible through the glass of the timepiece. It advantageously has a disc shape.

The timepiece can incorporate a wedge 44 arranged on the dial. This wedge 44 defines a horizontal support plane and is intended to support the substrate 10 carrying the antenna circuits. This wedge may have a circular or semi-circular shape and defines a constant thickness determined above the dial.

The substrate 10 of the antenna device 1 is arranged to be positioned on the wedge 44, the first plate thereof bearing against the bearing plane which is formed by the wedge. The connection portion 100 thereof is bent to be positioned vertically, along a plane transverse to the mean plane (P).

A first wedging element 45, for example made of insulating foam, can be positioned between the substrate and the bezel surmounting the middle.

A second element 46, for example made of insulating plastic, for example of semi-annular shape, includes an upper portion bearing against the top face of the substrate 10, a vertical portion extending downwards, up to the dial and a lower portion bearing against the dial.

A touch screen 47, for example of the capacitive type, can be fastened under the glass 42, on a major portion of the surface of the glass, separated from said second element 46 by air.

In order to fasten the bracelet, the timepiece includes, on either side of the middle thereof, two horns 48 each arranged to fasten a distinct strand of the bracelet.

The antenna device is multi-band to operate at least two communication circuits, which have different characteristics in terms of frequencies, polarization, gain and impedance.

For the impedance, the electronic control circuit 2 may include a radiofrequency duplexer/rejection filter 20.

For the gain and the polarization, it is the pattern of each antenna circuit 11, 12 which allows managing these parameters.

The use of a duplexer/rejection filter allows insulating the two communication circuits (Bluetooth and GPS for example).

By way of example, it should be noted that a Bluetooth type communication circuit requires a linear polarization while a GPS type communication circuit requires a circular polarization. The GPS system imposes in particular a polarization called left polarization.

Moreover, the solution of the invention allows taking into account the fact that the timepiece 4 includes a middle 40 made of metal material.

According to a particular aspect of the invention, the antenna device 1 is intended to be placed as high as possible in the case of the timepiece, that is to say as close as possible to the window, while remaining hidden from the eyes of the user.

Moreover, the arrangement of the antenna device 1 in the case of the timepiece, allows benefiting from the metal middle 40 of the timepiece, through which the antenna device 1 can emit its radiation. The bezel 41, which can be made of a ceramic type material, allows, in order not to damage the radiation, in particular laterally, by the addition of a high dielectric material, increasing the electrical length of the antenna and thus improving its efficiency relative to the physical size thereof.

The antenna device 1 being placed above the dial 43 which is also metallic, one benefits from a volume mainly filled with air (thus improving the efficiency of the antenna), above the antenna device. This metal dial 43 also acts as a screen, partly making any modification on the construction below this dial transparent vis-à-vis the antenna device 1.

Figure 3:
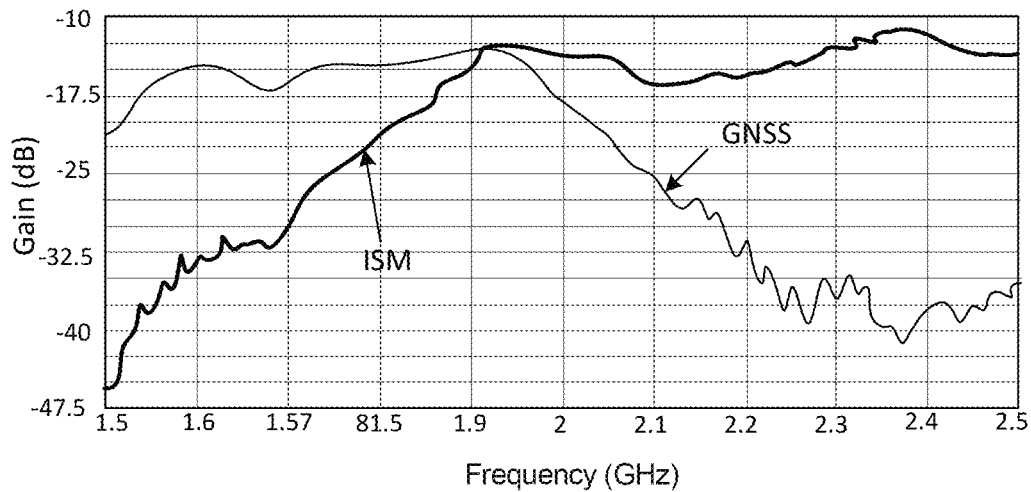
FIG. 3 represents a diagram illustrating the gain seen by each frequency band employed in the communication system of the invention.

FIG. 3 illustrates the performance in terms of gain, seen by each of the frequency bands, the ISM band (Industrial, Scientific and Medical—corresponding to the frequency band which is used by a network such as Bluetooth) and the GNSS frequency band (Geolocation and Navigation by a Satellite System), using the communication system of the invention.

Figure 4:
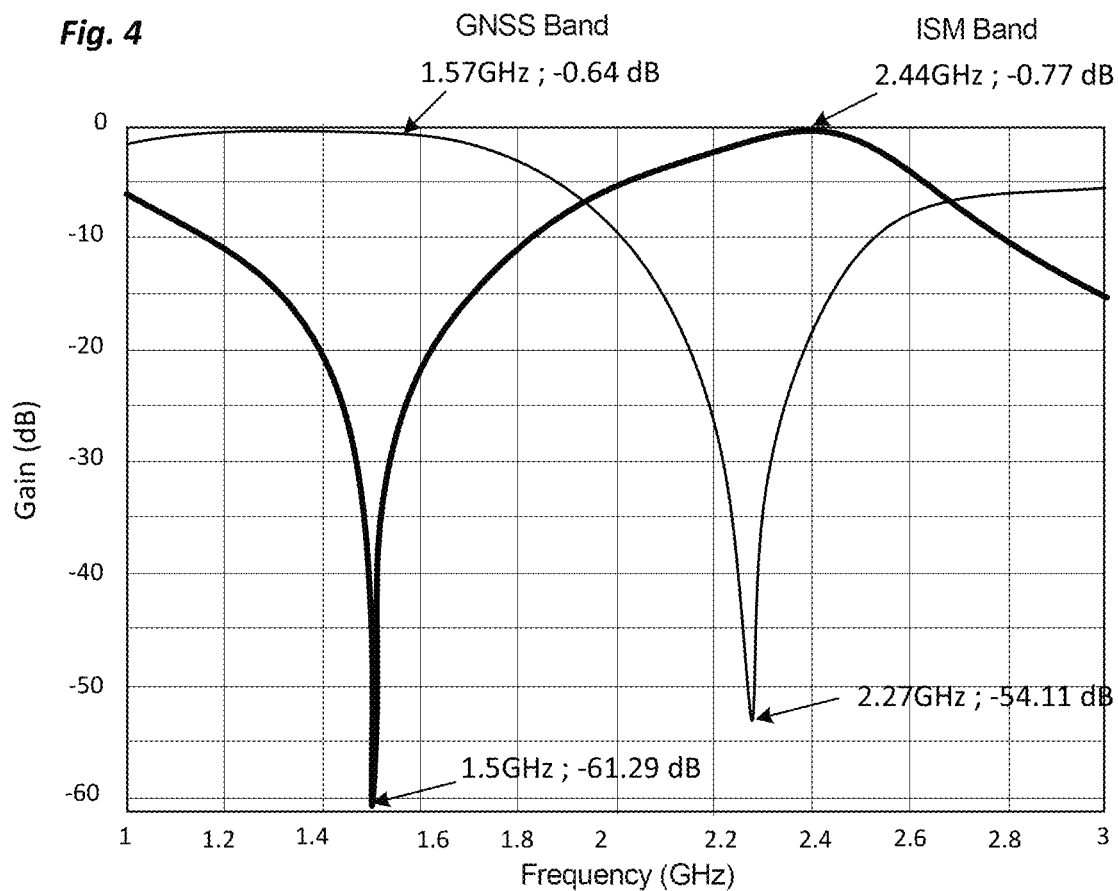
FIG. 4 represents a diagram illustrating the principle of insulation of the frequency bands which are permitted by the antenna device of the invention.

FIG. 4 represents two curves illustrating the separation of the frequency bands allowed by the use of the antenna device in accordance to the invention. It can be seen that the ISM band is well insulated from the GNSS frequency band.

It goes without saying that the present invention is not limited to the embodiment which has just been described and that various modifications and simple variants can be considered by those skilled in the art without departing from the scope of the invention as defined by the appended claims.

The invention claimed is:

1. An antenna device used in a communication system of a timepiece, the antenna device comprising:
    a substrate;
    a first antenna formed on said substrate and having first and second strands each having a proximal end and a distal end, and extending in parallel between the proximal and distal ends thereof, the first and second strands being connected at the proximal ends thereof and separated at the distal ends thereof;
    a second antenna formed on said substrate and having third and fourth strands each having a proximal end and a distal end, and extending in parallel between the proximal and distal ends thereof, the third and fourth strands being connected by the distal ends thereof and separated at the proximal ends thereof;
    an electrical junction link joining the proximal ends of the first and third strands;
    a connection portion configured to be bent relative to said electrical junction link, and including a conductive connection, which is connected to the electrical junction link and including an electromagnetic shielding of said conductive connection.

2. The device according to claim 1, wherein each of the first, second, third, and fourth strands are curved.

3. The device according to claim 1, wherein the substrate is a flexible plastic substrate.

4. The device according to claim 1, wherein the substrate is composed of a first plate having a face on which the first and second antennas are formed, said connection portion being configured to be bent relative to said first plate.

5. The device according to claim 1, wherein a first plate of the substrate has a circular arc-shaped profile.

6. The device according to claim 1, wherein the first and second antennas are disposed on either side of said electrical junction link.

7. A remote communication system for timepiece, comprising:
    an antenna device as defined in claim 1,
    a duplexer/rejection circuit connected to said electrical junction link via the conductive connection of the connection portion.

8. The communication system according to claim 7, wherein said duplexer/rejection circuit includes a first communication circuit configured to communicate according to a Bluetooth type protocol and a second communication circuit configured to communicate over a satellite positioning network via the first and second antennas respectively.

9. A timepiece comprising a case formed of a middle, an upper glass and a back wall, including a flange and a communication system as defined in claim 7, said substrate being disposed in the flange of the timepiece.

10. The timepiece according to claim 9, comprising an upper glass, said first and second antennas being positioned opposite to the upper glass thereof.

11. The timepiece according to claim 9, further comprising a metal dial placed inside the case thereof, said antenna device being positioned above the metal dial.

12. The timepiece according to claim 11, wherein said duplexer/rejection circuit is positioned below the metal dial.

13. The timepiece according to claim 9, wherein said timepiece is a connected watch.

14. The timepiece according to claim 10, wherein said timepiece is a connected watch.

\* \* \* \* \*